United States Patent

Winkler

[11] Patent Number: 5,905,631
[45] Date of Patent: May 18, 1999

[54] LOW-VOLTAGE SWITCHGEAR ASSEMBLY FOR THE OUTPUT OR DISTRIBUTION OF ELECTRICAL ENERGY

[75] Inventor: Johannes Winkler, Bornheim, Germany

[73] Assignee: Klöckner-Moeller GmbH, Bonn, Germany

[21] Appl. No.: 08/938,543

[22] Filed: Sep. 26, 1997

Related U.S. Application Data

[63] Continuation-in-part of application No. PCT/DE96/00508, Mar. 23, 1996.

[30] Foreign Application Priority Data

Mar. 28, 1995 [DE] Germany .......................... 195 11 347

[51] Int. Cl.$^6$ .................................................. H02B 1/26
[52] U.S. Cl. ........................... 361/641; 361/601; 361/605; 361/614; 361/725; 211/162; 312/223.1; 312/350
[58] Field of Search ..................................... 361/601, 605, 361/608, 614, 627, 641, 644, 645, 648, 724, 643, 823, 624, 725; 174/72 B, 68.2, 88 B; 312/223.1

[56] References Cited

U.S. PATENT DOCUMENTS

| 4,180,846 | 12/1979 | Wilson et al. | 361/643 |
| 4,502,097 | 2/1985 | Takanashi | 361/614 |
| 4,532,574 | 7/1985 | Reiner et al. | 361/660 |

FOREIGN PATENT DOCUMENTS

| 0186556 | 7/1986 | European Pat. Off. . |
| 4210679 | 10/1993 | Germany . |
| 9318564 | 9/1993 | WIPO . |

Primary Examiner—Leo P. Picard
Assistant Examiner—Boris L. Chervinsky
Attorney, Agent, or Firm—Nils H. Ljungman and Associates

[57] ABSTRACT

Guide members to guide the guide edges of plug-in units upon insertion of the plug-in units into the U-shaped bus duct of a low voltage switchgear assembly. The guide fittings are arranged on the inside of the side legs of the U-shaped bus duct, and the plug-in units are held between the side legs of the bus duct. Each of the guide members extends from and is made of the same material continuous with its corresponding side wall of the bus duct.

13 Claims, 6 Drawing Sheets

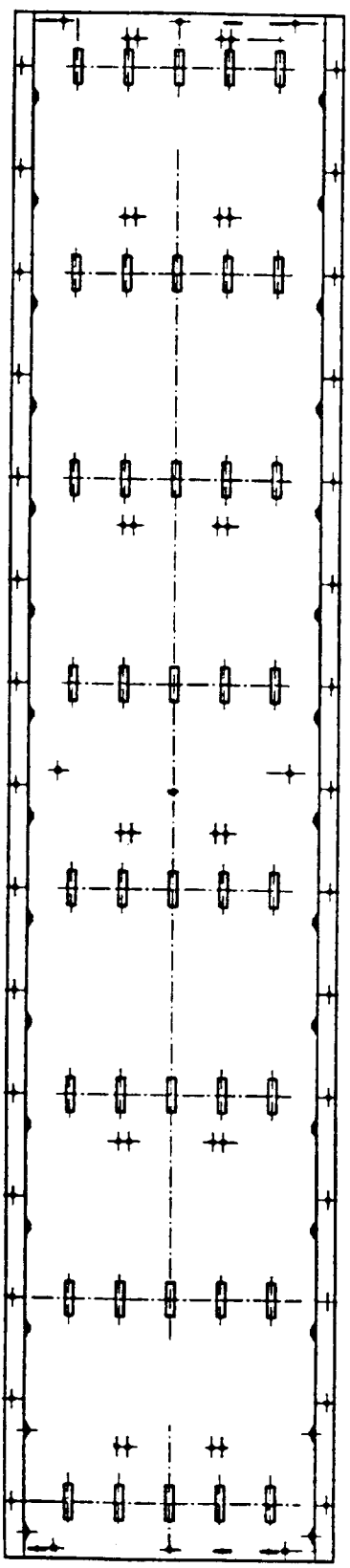
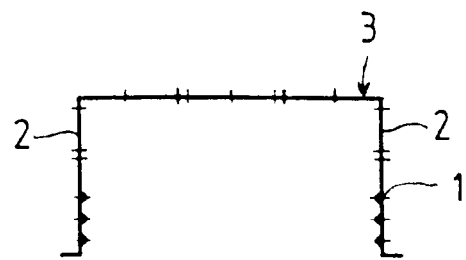
Fig.7
Fig.6

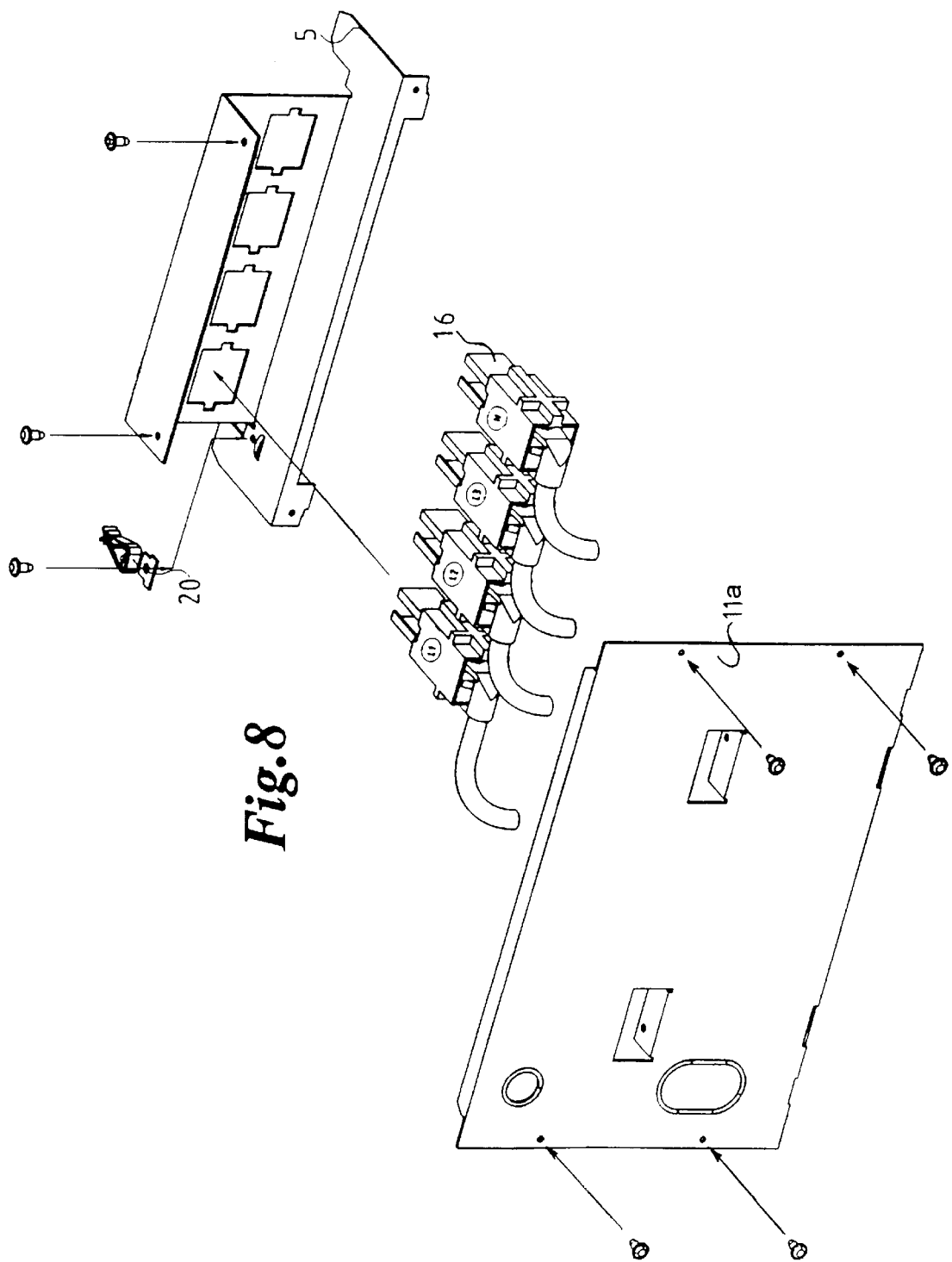

LOW-VOLTAGE SWITCHGEAR ASSEMBLY FOR THE OUTPUT OR DISTRIBUTION OF ELECTRICAL ENERGY

This application is a continuation in part of PCT/DE96/00508, filed Mar. 23, 1996.

BACKGROUND OF THE INVENTION

1. Field of the Invention

This invention relates to a low-voltage switchgear assembly or switchboard or switching station or distribution switchboard for distribution of electrical energy. The low-voltage switchgear assembly contains switching equipment or equipment groups located in plug-in units, containing equipment such as power circuit breakers, motor circuit breakers, motor control centers or similar devices. The plug-in units have guides in the switchgear cabinet and are provided with a cabinet-shaped metal housing and at least one switchgear cabinet door. At least the electrical connection from the bus bars to the switching equipment is of the plug-in type, whereby the guide fittings are stamped and the plug-in units have guide edges which run parallel to the plane of the floor, whereby moreover the bus bars are field bus bars which are connected to main bus bars.

2. Background Information

In power distribution applications, low-voltage switchgear assembles consisting of switching equipment or groups of equipment located in switchgear cabinets, also called motor control centers (MCCs) or energy control centers, have long been successfully used for the protection of equipment and motors.

The output and distribution of the electrical energy is achieved by means of common busbars or interchangeable equipment units or groups of equipment, whereby these groups of equipment contain switching and protection components, and are engaged with the busbars by means of plug-in contacts.

At least some of the equipment groups on distribution boards of this type are of the plug-in type, whereby at least the load current taps are realized in the form of plug-in contacts which are engaged on the busbars.

The load current and the control current connections or similar connections can be realized either as plug-in type connections or can be hard-wired.

The switching and protection components can be power circuit breakers, motor circuit breakers, contactors and combinations of these components, such as a reversing star-delta combination or a similar combination.

German Patent No. A1 42 10 679 describes a similar power distribution board which has cross struts which run parallel to the insertion direction, which cross struts have guide means for the plug-in units, whereby the guide means are realized in the form of graduated or step-shaped or Z-shaped guide extensions and are stamped in one piece out of the material, which material was used to manufacture the guide means.

These guide means, of course, are relatively economical, but if the field bus bar system is designed to be a compact unit, cross struts are also necessary for guidance. European Patent No. 0 186 556 illustrates and describes a field bus bar system with a bus duct, whereby the plug-in units are located on the sides. The bus system forms a compact unit which can be installed in any desired metal switchgear cabinet. However there is no guidance of the plug-in units in the sense of the present invention.

WO 93/18564 also describes a power distribution board which has guide slots located on wall elements, although the distribution board in question is complex and expensive to construct.

OBJECT OF THE INVENTION

The object of the present invention is therefore to create a low-voltage switchgear assembly which, with little constructional effort, is provided with guidance for the equipment sets, whereby the field bus bar system is equipped as a compact unit and can thus be installed in any desired switchgear cabinet.

SUMMARY OF THE INVENTION

The present invention teaches that this object can be accomplished by locating the guide fittings on the inside of side legs of a U-shaped bus duct, whereby the plug-in units are held between the side legs, and the guide fittings are stamped out of the material of the Bide leg of the bus duct.

As a result of locating the guide fittings on the inside of side legs of a U-shaped bus duct, whereby the plug-in units are held between the side legs, and the guide fittings are stamped out of the material of the side leg of the bus duct, a motor control center with withdrawable or plug-in units can be created which is relatively easy to operate and relatively inexpensive to manufacture.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The invention, additional embodiments and improvements of the invention and additional advantages are described and explained in greater detail below with reference to the preferred embodiments which are illustrated in the accompanying drawings, in which:

FIG. 6 is a two-dimensional representation of the gutter-shaped bus duct part from the front;

FIG. 7 is a two-dimensional representation of the gutter-shaped bus duct part from the top;

FIG. 8 is an exploded view in perspective of the plug-in type unit;

DESCRIPTION OF THE PREFERRED EMBODIMENT

Figure 1:
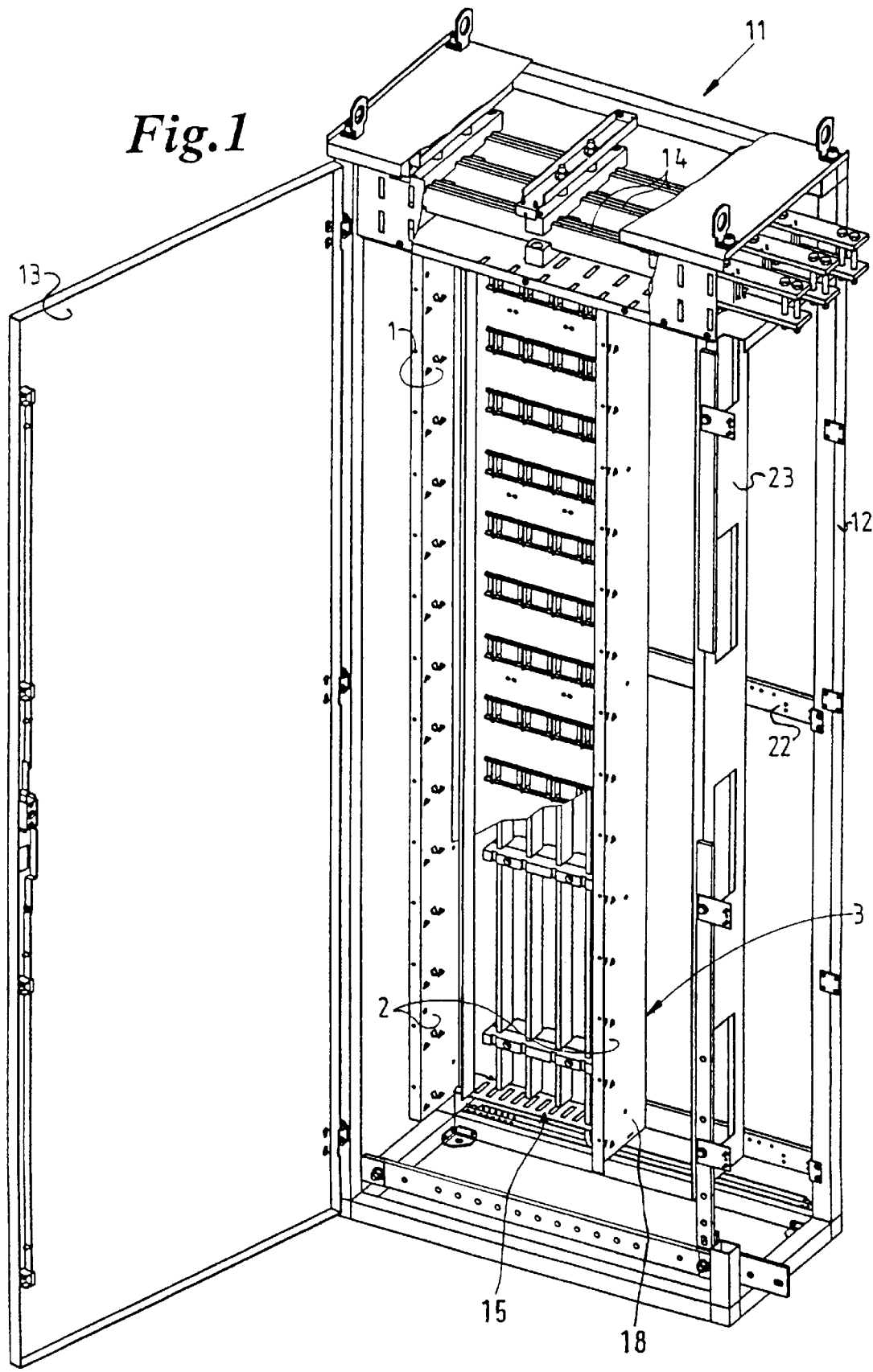
FIG. 1 shows a view in perspective of a distribution panel.
Figure 2:
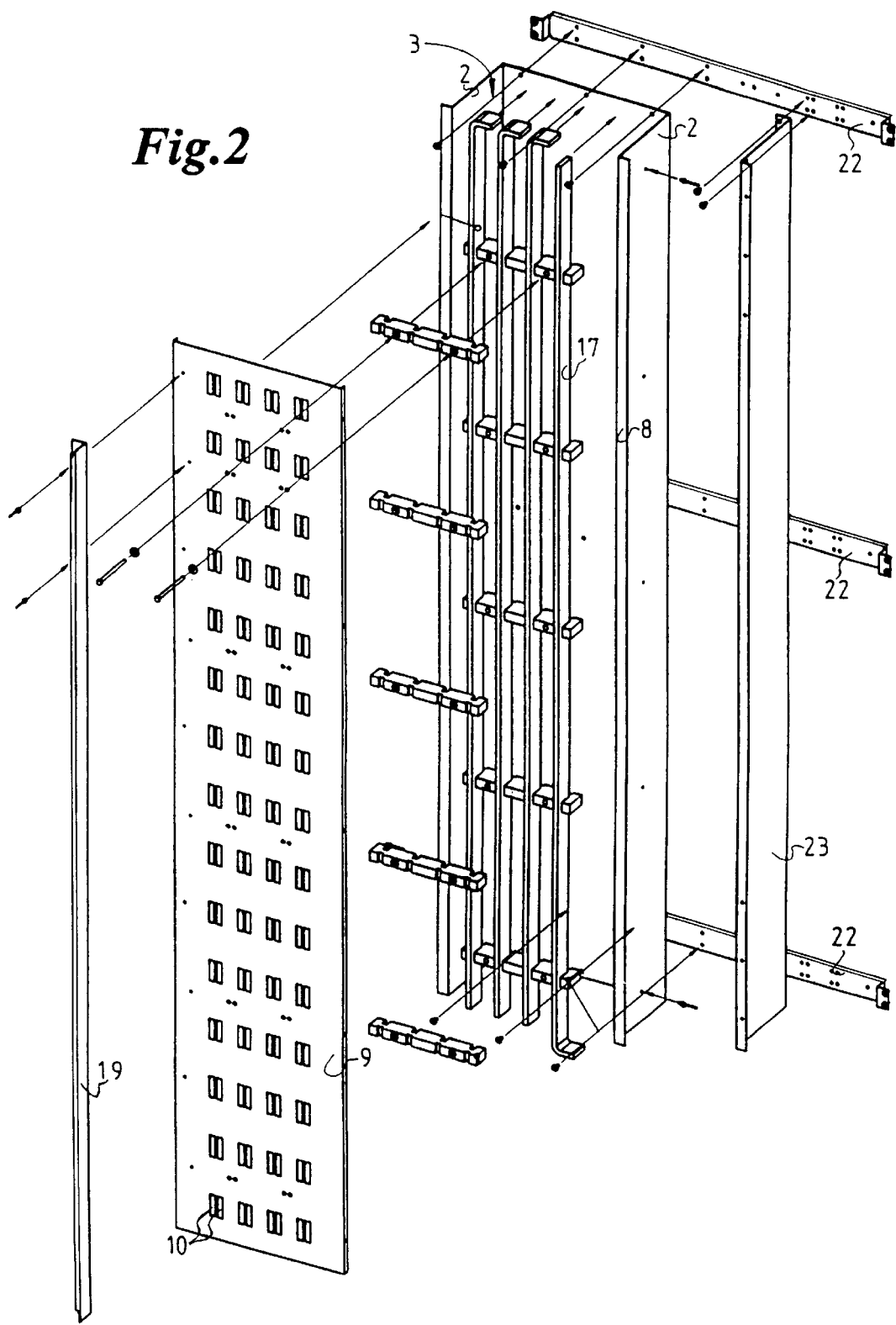
FIG. 2 shows an exploded view in perspective of the field busbar system.

The power distribution board 11 illustrated in FIGS. 1 and 2 of the low-voltage switching system comprises a metal housing, i.e. a frame 12, panel elements and a switchgear cabinet door 13. The distribution board 11 also consists of a main bus bar system 14, which main bus bar system 14 is located on top and is parallel to the plane of the ceiling, a field bus bar system 15, which field bus bar system 15 is oriented perpendicular to the plane of the floor, with a bus duct 3 and plug-in type units 4, which plug-in type units 4 are illustrated in further detail in FIGS. 8 and 9.

In accordance with one embodiment of the present invention, the power distribution board 11 of the low-voltage switching system includes a metal housing, i.e. a frame 12, panel elements and a switchgear cabinet door 13. The distribution board 11 also includes a main bus bar system 14, which main bus bar system 14 is located on top and is parallel to the plane of the ceiling, a field bus bar system 15 (see FIG. 1A) including field bus bars 17, which field bus bars 17 are oriented perpendicular to the plane of the floor, with a bus duct 3 and plug-in type units 4, which plug-in type units 4 are illustrated in further detail in FIGS. 8 and 9.

The switching equipment or groups of switching equipment, such as power circuit breakers, motor control centers or similar devices, which devices are located on the plug-in units 4, are engaged with the field bus bars 17 (see FIG. 2) by means of power current plugs 16. An example of the power current plugs 16 is shown in FIG. 8.

Figure 5:
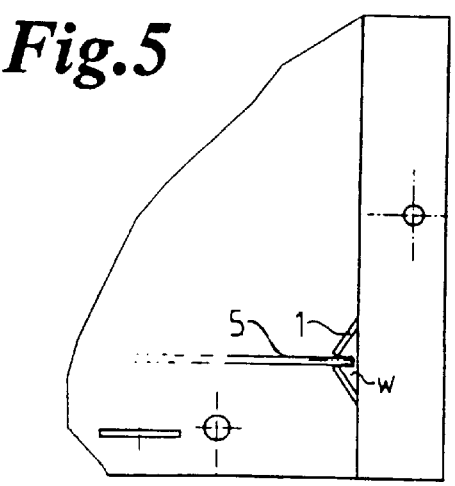
FIG. 5 is a detail of the guide lugs from the side.

The plug-in type units 4 have guide edges 5, which guide edges 5 run parallel to the plane of the floor. The guide edges 5 lie between the guide fittings 1 when the plug-in unit 4 is inserted, as illustrated in FIG. 5. The guide fittings 1 are located on the inside of the side legs 2 of the essentially U-shaped bus duct 3, whereby the plug-in units 4 are held between the side legs 2.

The bus duct 3 consists of a gutter-shaped bus duct part 18 (see FIG. 1A), the shape of which is illustrated in FIGS. 6 and 7. The bus duct 3 also consists of a barrier plate 9 (see FIG. 2) to cover the field bus bars 17.

FIG. 6 illustrates a front view of the U-shaped bus duct 3. FIG. 7 illustrates a top-down view of the bus duct 3 illustrating the side walls 2 and possible examples of guide fittings 1.

The barrier plate 9 which is fastened in the bus duct 3 between the side legs 2 is provided with openings 10 for the power current plugs 16, whereby the barrier plate 9 includes a sheet metal section.

The side legs 2 approximately lock with or end at the plug-in unit mounting plate 11a.

To reinforce and screw the plug-in unit 4 in place using screws 25 (see FIG. 8), the bus duct 3 is provided with two segments 8 on the side legs 2, which segments 8 are bent at right angles parallel to the plane of the rear wall. To ground the plug-in units 4 there is an L-shaped profile rail or mounting channel 19 located directly on the barrier plate 9, whereby the plug-in units 4 have a grounding contact 20 located on the side.

The guide fittings 1 are stamped out of the material of the side leg 2 of the bus duct 3, and are provided as guide lugs which are engaged above and below the guide edge 5 of the plug-in unit 4, whereby these lugs are stamped out diagonally, preferably at an angle (w) of approximately 30 to 40 degrees.

Figure 4:
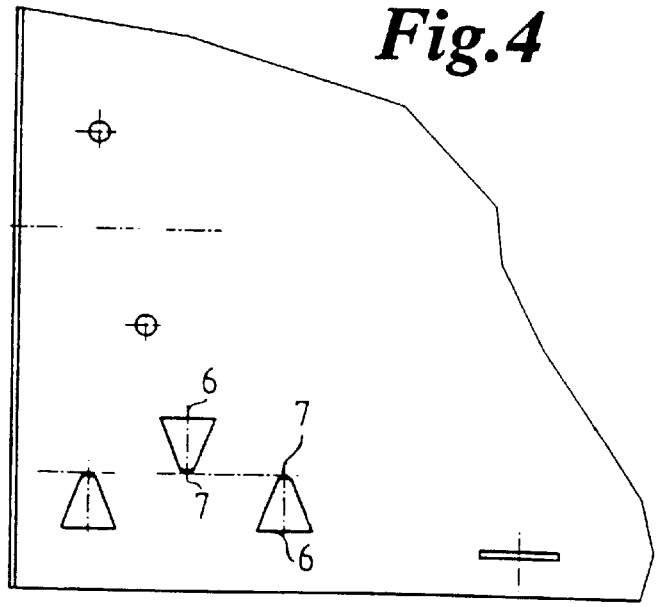
FIG. 4 is a detail of the guide lugs from the front.

As shown in FIG. 4, the guide fittings 1 include three guide fittings 1 for each guide side, whereby the guide fittings which are above and below the guide edge 5 of the plug-in unit 4 are offset from one another.

Figure 3:
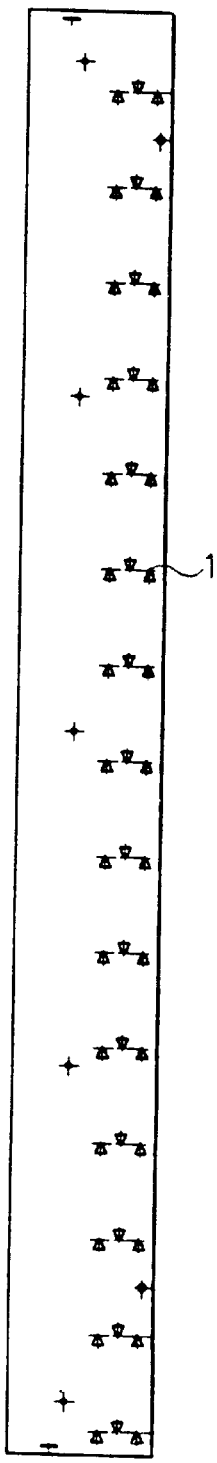
FIG. 3 is a side view of a side leg of the side duct.
Figure 9:
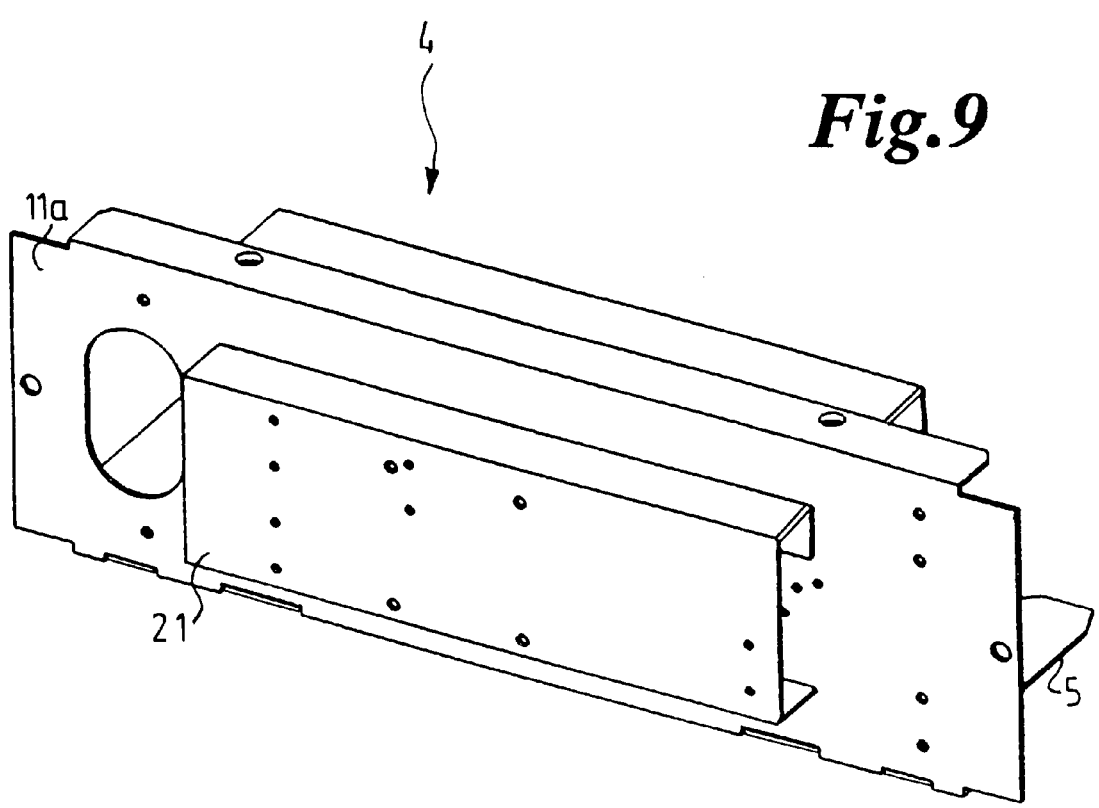
FIG. 9 is a view in perspective of the plug-in type unit.

As shown in FIG. 3, there are fifteen guide planes located one on top of another, whereby a plug-in unit 4 can very easily require a plurality of guide planes, as illustrated by the size differences between the plug-in units illustrated in FIGS. 8 and 9.

The guide fittings 1 are also approximately triangular in shape. These guide fittings have a base leg 6 which is molded in one piece with the side leg 2, and a corner 7 which acts as a support point for the plug-in unit.

In accordance with one embodiment of the present invention, the guide fittings 1 can be approximately triangular in shape. These guide fittings 1 have a base leg 6 which is molded in one piece with the side leg 2, and a corner 7 which acts as a support point for the plug-in unit.

As shown in FIG. 9, there is also a spacer element 21 in the form of a U-shaped or C-shaped mounting plate on the plug-in unit mounting plate 11a.

To separate the equipment space and the customer connection space, there is a partition 23, Which partition 23 is oriented parallel to the side legs 2, and which partition 23 is fixed to a plurality of cross struts 22, which cross struts 22 are fastened to the frame 12.

The cross struts 22, which are illustrated in FIGS. 1 and 2, are also provided for the fastening of the bus duct 3.

One feature of the invention resides broadly in the low voltage switchgear assembly for output or distribution of electrical energy with switching equipment or equipment groups located in plug-in units, containing equipment such as power circuit breakers, motor circuit breakers, motor control centers or similar devices, which plug-in units have guides in the switchgear cabinet and are provided with a cabinet-shaped metal housing and at least one switchgear cabinet door, whereby at least the electrical connection from the bus bars to the switching equipment is of the plug-in type, whereby the guide fittings are stamped and the plug-in units have guide edges which run parallel to the plane of the floor, whereby moreover the bus bars are field bus bars which are connected to main bus bars, characterized by the fact that the guide fittings 1 are located on the inside of side legs 2 of a U-shaped bus duct 3, whereby the plug-in units 4 are held between the side legs, and that the guide fittings 1 are stamped out of the material of the side leg 2 of the bus duct.

Another feature of the invention resides broadly in the low-voltage switchgear assembly characterized by the fact that the guide fittings 3 are realized in the form of guide lugs which are engaged above and below the guide edge 5 of the plug-in unit.

Yet another feature of the invention resides broadly in the low-voltage switchgear assembly characterized by the fact that the guide fittings consist of at least three guide fittings for one guide side, whereby the guide fittings which are above and below the guide edge 5 of the plug-in unit 4 are offset from one another.

Still another feature of the invention resides broadly in the low-voltage switching system characterized by the fact that the guide fittings are approximately triangular in shape, consist of a base leg 6 which is molded in one piece on the side leg 2, and a corner 7 which acts as a support point for the plug-in unit.

A further feature of the invention resides broadly in the low-voltage switching system characterized by the fact that the guide fittings are stamped out diagonally.

Another feature of the invention resides broadly in the low-voltage switching system characterized by the fact that the guide fittings are stamped out at an angle (w) of approximately 30 to 40 degrees of angle.

Yet another feature of the invention resides low-voltage low-voltage switching system characterized by the fact that the field bus bars 17 are oriented perpendicular to the plane of the floor and are located next to one another on the rear wall.

Still another feature of the invention resides broadly in the low-voltage switching system characterized by the fact that the bus duct 3 has two segments 8 on the side legs 2, which segments are bent at right angles parallel to the plane of the rear wall.

A further feature of the invention resides broadly in the low-voltage switching system characterized by the fact that a barrier plate 9 with openings 10 and made of a piece of sheet metal is fastened in the bus duct 3 between the side legs 2.

Another feature of the invention resides broadly in the low-voltage switching system characterized by the fact that the side legs 2 approximately lock with or end at the plug-in mounting plate.

Yet another feature of the invention resides broadly in the low-voltage switching system characterized by the fact that for the grounding of the plug-in units 4, there is an L-shaped profile rail 19 located directly on a barrier plate 9, whereby the plug-in units 4 have a grounding contact 20 located on the side.

Still another feature of the invention resides broadly in the low-voltage switching system characterized by the fact that a spacer element 21 in the form of a U-shaped or C-shaped mounting plate is located on a plug-in unit mounting plate 11a.

A further feature of the invention resides broadly in the low-voltage switching system characterized by the fact that it is provided with a nominal current of up to 2500 Amperes.

Another feature of the invention resides broadly in the low-voltage switching system characterized by the fact that to separate an equipment compartment and a customer connection compartment, there is a partition 23 which is oriented parallel to the side legs 2, and which is held in place on a plurality of cross struts 22 which are fastened to a frame 12.

Yet another feature of the invention resides broadly in the low-voltage switching system characterized by the fact that the bus duct 3 is fixed to a plurality of cross struts 22 which are fastened to a frame 12.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

Examples of switchgear assemblies and components associated therewith which may be used in conjunction with the present invention may be found in the following U.S. Pat. No. 5,362,933; and U.S. Pat. No. 5,101,080.

Additional examples of switchgear assemblies and components associated therewith which may be used in conjunction with the present invention may be found in the following U.S. Pat. No. 5,449,056; U.S. Pat. No. 5,466,973; U.S. Pat. No. 5,466,974; U.S. Pat. No. 5,394,134; U.S. Pat. No. 5,477,017; and U.S. Pat. No. 5,418,328.

The corresponding foreign and international patent publication applications, namely, Federal Republic of Germany Patent Application No. 195 11 347.0, filed on Mar. 28, 1995, and PCT/DE96/00508, filed on Mar. 23, 1996, having inventor Johannes Winkler, and DE-OS 195 11 347.0, filed on Mar. 28, 1995, and DE-PS 195 11 347.0, filed on Mar. 28, 1995, and WIPO No. WO 96/30982, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. Low voltage switchgear assembly for distribution of electrical energy, said low voltage switchgear assembly comprising:

a switchgear housing;

at least one door disposed on said switchgear housing;

switching equipment disposed within said switchgear housing;

said switching equipment comprising plug-in units;

at least one main bus bar;

at least one field bus bar connected to said at least one main bus bar;

said plug-in units comprising plug-in connections to connect said switching equipment to said at least one field bus bar;

said plug-in units comprising guide edges;

a U-shaped bus duct which houses bus bars;

said U-shaped bus duct comprising a base portion and two side walls extending from said base portion;

said guide edges of said plug-in units being configured to be disposed substantially transverse to said base portion of said U-shaped bus duct;

said switchgear housing comprising guide members to guide said guide edges of said plug-in units upon insertion of said plug-in units into said U-shaped bus duct;

said plug-in units being disposed between said side walls of said U-shaped bus duct; and each of said guide members extending from and being made of the same material continuous with its corresponding side wall of said U-shaped bus duct.

2. The low voltage switchgear assembly according to claim 1 wherein said guide members comprise protrusions extending from said side walls.

3. The low-voltage switchgear assembly according to claim 2 wherein:

each of said protrusions comprises a portion stamped from said side walls;

said protrusions comprise guide lugs;

at least one of said guide lugs is disposed above said guide edge of said plug-in unit; and at least one of said guide lugs is disposed below said guide edge of said plug-in unit.

4. The low voltage switchgear assembly according to claim 3 wherein:

said U-shaped bus duct comprises two segments on said side walls; and said segments are bent at substantially right angles substantially parallel to said base portion of said U-shaped bus duct.

5. The low voltage switchgear assembly according to claim 4 comprising:

a barrier plate;

said barrier plate comprising openings; and said barrier plate comprising a piece of sheet metal being fastened in said U-shaped bus duct between said two side walls of said U-shaped bus duct.

6. The low voltage switchgear assembly according to claim 5 wherein:

each of said side walls comprises an end;

each of said plug-in units comprises a mounting plate;

said mounting plate of each of said plug-in units is disposed adjacent said ends of said side walls.

7. The low voltage switchgear assembly according to claim 6 comprising an L-shaped profile rail being disposed on said barrier plate to ground said plug-in units.

8. The low voltage switchgear assembly according to claim 7 wherein each of said plug-in units comprises a grounding contact to contact said L-shaped profile to ground each of said plug-in units.

9. Low voltage switchgear assembly for distribution of electrical energy, said low voltage switchgear assembly comprising:

a switchgear housing;

switching equipment disposed within said switchgear housing;

said switching equipment comprising plug-in units;

a bus bar arrangement;

each of said plug-in units comprising plug-in connections to connect said switching equipment to said bus bar arrangement;

each of said plug-in units comprising guide edges;

a U-shaped bus duct which houses bus bars;

said U-shaped bus duct comprising a base portion and two side walls extending from said base portion;

said switchgear housing comprising guide members to guide said guide edges of said plug-in units upon insertion of said plug-in units into said U-shaped bus duct;

said plug-in units being disposed between said side walls of said U-shaped bus duct; and each of said guide members extending from and being made of the same material continuous with its corresponding side wall of said U-shaped bus duct.

10. The low voltage switchgear assembly according to claim 9 wherein said guide members comprise protrusions extending from said side walls.

11. The low-voltage switchgear assembly according to claim 10 wherein:

each of said protrusions comprises a portion stamped from said side walls;

said protrusions comprise guide lugs;

at least one of said guide lugs being disposed above said guide edge of said plug-in unit; and at least one of said guide lugs being disposed below said guide edge of said plug-in unit.

12. The low voltage switchgear assembly according to claim 11 wherein:

said U-shaped bus duct comprises two segments on said side walls; and said segments are bent at substantially right angles substantially parallel to said base portion of said U-shaped bus duct.

13. The low voltage switchgear assembly according to claim 12 comprising:

a barrier plate;

said barrier plate comprising openings; and said barrier plate comprising a piece of sheet metal being fastened in said U-shaped bus duct between said two side walls of said U-shaped bus duct.

* * * * *

UNITED STATES PATENT AND TRADEMARK OFFICE
CERTIFICATE OF CORRECTION

PATENT NO. : 5,905,631
DATED : May 18, 1999
INVENTOR(S) : Johannes WINKLER

It is certified that error appears in the above-indentified patent and that said Letters Patent is hereby corrected as shown below:

In column 2, line 19, after the second occurrence of 'the', delete "Bide" and insert --side--.

In column 5, line 3, after 'resides', delete "low-voltage" and insert --broadly in the--.

Signed and Sealed this

Twenty-first Day of March, 2000

Attest:

Q. TODD DICKINSON

*Attesting Officer*  *Commissioner of Patents and Trademarks*